Oct. 31, 1950 S. B. HASELTINE 2,527,676
FRICTION SHOCK ABSORBING MECHANISM
Filed Nov. 6, 1946 2 Sheets—Sheet 1
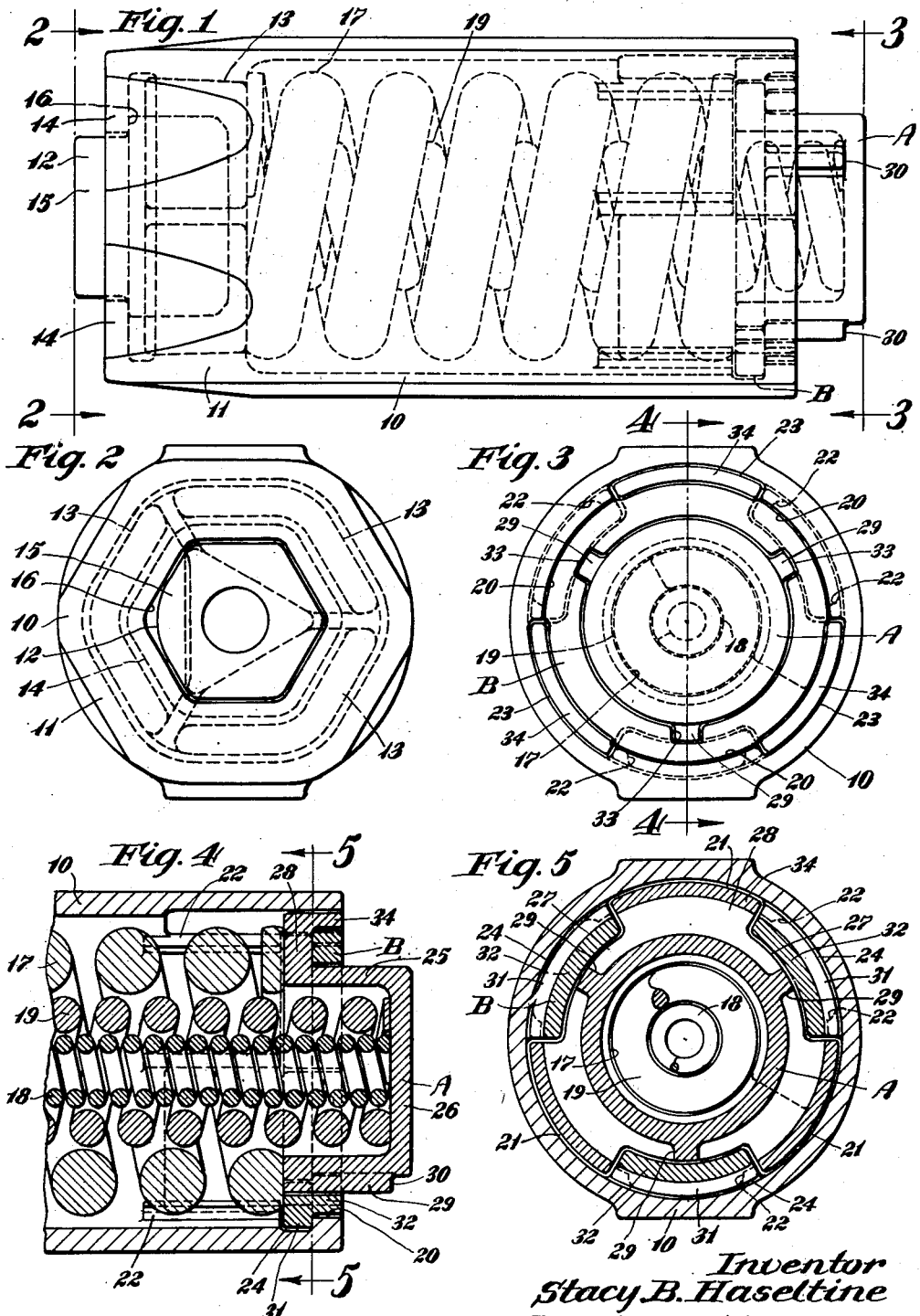
Inventor
Stacy B. Haseltine
By Henry Fuchs
Atty.

Oct. 31, 1950     S. B. HASELTINE     2,527,676
FRICTION SHOCK ABSORBING MECHANISM
Filed Nov. 6, 1946     2 Sheets-Sheet 2
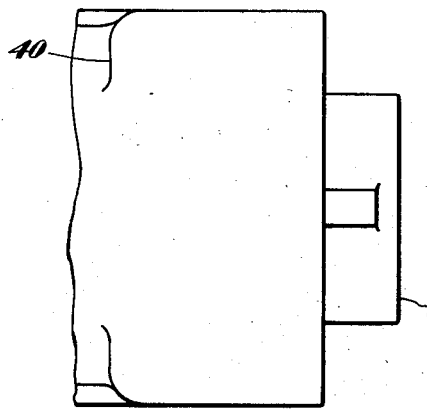
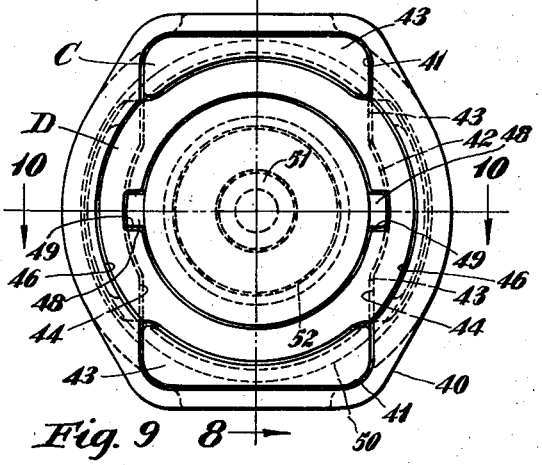
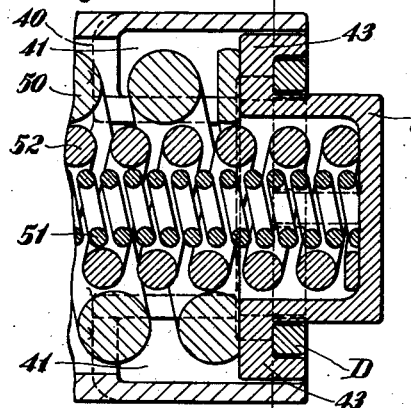
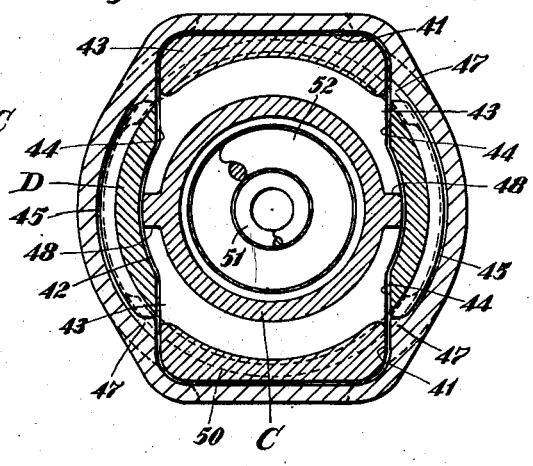
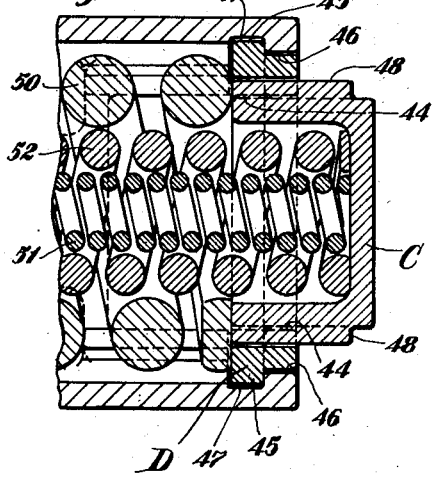
Inventor
Stacy B. Haseltine
By Henry Fuchs
Atty.

Patented Oct. 31, 1950

2,527,676

UNITED STATES PATENT OFFICE 2,527,676

FRICTION SHOCK ABSORBING MECHANISM

Stacy B. Haseltine, La Grange, Ill., assignor to W. H. Miner, Inc., Chicago, Ill., a corporation of Delaware Application November 6, 1946, Serial No. 708,037

4 Claims. (Cl. 267—9)

This invention relates to improvements in friction shock absorbing mechanisms, and more particularly to mechanisms of this character comprising a casing having a friction shell section at one end thereof, a friction clutch comprising a wedge and shoes slidable in the shell, a spring resistance opposing inward movement of the shoes, and a movable spring cap at the other end of the casing, movement of which inwardly of the casing is opposed by the spring resistance.

One object of the invention is to provide in a mechanism as set forth in the preceding paragraph, detachable retaining means for the spring cap comprising a locking ring having a bayonet connection with the casing including lugs on the ring engageable with retaining flanges or lugs on the casing to hold the ring against lengthwise movement with respect to the casing, together with simple and efficient means for locking the ring against rotation to prevent accidental detachment of the same.

A more specific object of the invention is to provide a retaining means of the character indicated for a spring cap of a friction shock absorbing mechanism, wherein the means for locking the ring against rotation comprises cooperating guide means on the casing and cap for restricting the cap to movement lengthwise of the casing and interlocking cooperating guide means of rib and groove formation on the cap and ring for holding the ring against rotation with respect to the cap.

Other objects of the invention will more clearly appear from the description and claims hereinafter following.

In the accompanying drawings forming a part of this specification, Figure 1 is a side elevational view of a friction shock absorbing mechanism embodying my invention. Figure 2 is a front elevational view, looking toward the right in Figure 1, as indicated by the arrows 2—2. Figure 3 is a rear elevational view, looking toward the left in Figure 1, as indicated by the arrows 3—3. Figure 4 is a longitudinal, vertical sectional view, corresponding substantially to the line 4—4 of Figure 3, showing the rear end portion of the mechanism. Figure 5 is a transverse, vertical sectional view, corresponding substantially to the line 5—5 of Figure 4. Figure 6 is a view similar to Figure 1, illustrating another embodiment of the invention, said view illustrating the rear end portion of the mechanism only, the front end portion of the same being broken away. Figure 7 is a rear elevational view of Figure 6, looking toward the left in said figure. Figure 8 is a longitudinal, vertical sectional view, corresponding substantially to the line 8—8 of Figure 7. Figure 9 is a transverse, vertical sectional view, corresponding substantially to the line 9—9 of Figure 8. Figure 10 is a horizontal, longitudinal sectional view, corresponding substantially to the line 10—10 of Figure 7.

The friction shock absorbing mechanism illustrated in Figures 1 to 5 inclusive of the drawings comprises a friction casing 10 of cylindrical, transverse cross section throughout the major portion of its length and having a friction shell section proper 11 at its forward end, which is of hexagonal, interior and exterior cross section. The friction shell section 11 of the casing 10 is of well-known design and has a friction clutch slidingly telescoped therein, the friction clutch comprising a central wedge block 12 and three friction shoes 13—13—13 surrounding the wedge block. As is well known, the wedge block 12 has wedging engagement with the shoes 13 and the latter have sliding frictional engagement with the interior walls of the hexagonal friction shell section of the casing. The wedge block 12 has its outward movement limited by shouldered engagement with an inturned, annular flange or shoulder 14 at the front end of the casing, the block having a reduced forward projection 15 extending through the opening provided by the flange 14, thus providing a shoulder 16 at the inner end of said forward projection which engages in back of the flange 14.

The casing 10 contains the usual spring means, which yieldingly opposes inward movement of the friction clutch, comprising a plurality of helical coil springs. This spring means, as shown, comprises three coils, an outer heavy coil 17, a light central coil 18, and an intermediate coil 19 which is heavier than the coil 18 and lighter than the coil 17.

Referring to Figures 1 to 5 inclusive, my improvements comprise broadly a spring cap A at the rear end of the casing 10 and interlocked therewith against relative rotation, and a retaining ring B having a bayonet joint connection with the casing and held against rotation by being interlocked with the spring cap.

In carrying out my invention, as illustrated in Figures 1 to 5 inclusive, the casing 10, which is open at its rear end, is provided with three circumferentially spaced, inturned retaining flanges 20—20—20 at its open rear end. The rear end portion of the casing 10 is further provided with three interior, circumferentially spaced guideways 21—21—21, extending lengthwise thereof, these guideways being formed by six lengthwise extending, interior ribs 22. The guideways 21 are alternated with the flanges 20 of the casing and the two ribs 22—22, which define the opposite side walls of each guideway 21, are respectively in longitudinal alignment with the ends of the flanges 20—20 which are at opposite sides of the corresponding guideway. The openings between the flanges 20—20—20, which openings are indicated by 23—23—23, are thus in longitudinal alignment with the guideways 21—21—21. The ribs 22 terminate short of the rear end of the casing 10, that is, their rear ends are spaced inwardly from the inner sides of the corresponding flanges 20, thus providing seats 24 at opposite ends of each of the flanges 20 and rearwardly of the latter for a purpose hereinafter pointed out.

The spring cap A is of cup-shaped form comprising a short, hollow, cylindrical, tubelike section 25 closed at its outer end by a transverse wall 26. At its inner end, the cap A has a laterally outstanding, annular stop flange 27 provided with circumferentially spaced extensions forming guide wings or arms 28 which fit the guideways 21 of the casing for sliding movement lengthwise of the mechanism.

The cylindrical portion 25 of the cap A is provided with three outstanding ribs 29—29—29, spaced equally about the circumference of the cap. These ribs extend lengthwise of the cap, rearwardly from the flange 27 thereof, and terminate short of the outer end of the cap, as indicated at 30.

The ring B surrounds the cylindrical portion 25 of the cap A, the opening of the ring being of such a side as to accommodate the tubular portion of the cap for movement in a direction lengthwise of the mechanism. At the inner side, the ring B has three radially projecting, circumferentially spaced, retaining flanges 31—31—31, which are engaged in back of the retaining flanges 20—20—20 of the casing. The flanges 31 are formed on the outer ends of offset arms 32 extending from the body of the ring B, which are engaged in the openings between the arms 28 of the cap. The retaining flanges 31 are of such a size that they will pass freely through the openings 23 between adjacent flanges 20—20 of the casing when the ring is pushed into the casing, and are of such a thickness that they will pass freely in edgewise direction between the rear ends of the ribs 22 and the flanges 20. Each flange 31 is of substantially the same length as the corresponding flange 20 of the casing and has its opposite ends extending into the seats 24—24 defined by the ends of the ribs 22—22 and the associated flange 20. As will be evident, the flanges 31 hold the ring B against both inward and outward movement when in their seated position between the ends of the ribs 22 and the flanges 20.

The ring B is further provided with internal notches or lengthwise extending grooves 33—33—33 adapted to accommodate the ribs 29—29—29 which snugly fit within the same but permit lengthwise sliding movement of the cap with respect to the ring.

The spring means of the friction shock absorbing mechanism, comprising the coils 17, 18, and 19, bears directly on the cap A and normally holds the same in projected position, as shown in Figures 1 and 4, thus locking the ring B against rotation with respect to the casing 10, the ribs 29—29—29 of the cap A being engaged in the notches 33—33—33 of the ring B, thereby locking these two members together as a unit, and the arms or wings 28 of the cap, in turn, locking the cap against rotation by engagement in the guideways 21. The spaces between the periphery of the ring B and the side wall of the casing at the openings 23 are preferably closed by arc-shaped, rearwardly projecting flanges 34—34—34 on the arms 28—28—28 of the cap.

In assembling the mechanism, the friction clutch and the springs 17, 18, and 19 are first placed within the casing 10 by inserting the same through the open rear end of the casing while the latter is stood on end. The spring cap A is then laid on top of the springs with the arms or wings 28—28—28 aligned with the openings 23—23—23 between the flanges 20—20—20 so that the same will enter the guideways 21—21—21, and the locking ring B is placed over the cap in position, resting on the ends of the ribs 29—29—29 of the cap, with the flanges 31—31—31 aligned with the flanges 28—28—28 of the cap and the openings 23—23—23 of the casing. Pressure is then applied directly to the cap only by any suitable means, such as a press, to push it into the casing against the resistance of the springs 17, 18, and 19, lowering the ring therewith. The cap with the ring thereon is forced downwardly until the flanges 31—31—31 of the ring are disposed rearwardly of the flanges 20—20—20 and in transverse alignment with the openings or seats 24 at the inner ends of the ribs 22. After being brought to this position, the ring is given a partial turn to engage the flanges 31 in back of the flanges 20. The notches 33 of the ring are thus brought into alignment with the ribs 29 of the cap A. Inward pressure is then removed from the cap A, permitting the springs 17, 18, and 19 to expand and force the cap outwardly, thereby bringing the ribs 29 into interlocking relation with the notches 33.

When the mechanism has been thus completely assembled, outward movement of the cap A is limited by engagement of the flange 27 thereof with the ring B, and the ring B is held against rotation by being interlocked with the cap A, which, in turn, is held against rotation with respect to the casing by the interengaging guide means on the cap and casing.

The spring cap A may be readily removed, when for any reason it is found desirable to take the gear apart, by forcing the cap A inwardly until the ribs 29 are disengaged from the ring B and then by turning the ring to disengage the same from the flanges 20 of the casing.

Referring next to the embodiment of the invention ilustrated in Figures 6 to 10 inclusive, the construction is the same as that illustrated in Figures 1 to 5 inclusive with the exception that the rear end of the casing, which is indicated by 40, is vertically expanded to form top and bottom, interior guideways for the cap, that the spring cap is correspondingly modified, that the locking ring and casing have two sets of interengaging stop flanges, instead of three, and that the interengaging ribs and notches of the cap and locking ring are two in number, instead of three.

As shown in Figures 6 to 10 inclusive, the rear end portion 40 of the casing is vertically expanded to provide top and bottom, interior guideways 41—41 of channel-shaped form. The spring cap, which is indicated by C, is of cup-shaped form and has an annular, laterally outstanding flange 42 having diametrically opposite, outwardly extending, top and bottom wings or arms 43—43 slidingly engaged in the top and bottom guide channels 41—41. The locking ring, which is indicated by D, surrounds the cup-shaped body of the cap C and has the opposed top and bottom side wall portions thereof cut out at its inner end to provide vertically aligned channels or seats 44—44 accommodating the wings or arms 43—43. The inner end of the ring is expanded to accommodate the flange 42 of the cap and said expanded portion is provided with laterally extending, diametrically opposite, arc-shaped retaining flanges 45—45, which engage in back of a pair of diametrically opposite, inturned flanges 46—46 at the rear end of the casing 40 and have their extremities engaged in interior seats 47—47 formed in the casing wall immediately in back of the flanges 46—46. The cap C also has a pair of diametrically opposite, exterior, longitudinally extending ribs 48—48 which engage in interior notches 49—49 of the ring D and terminate short of the rear end of the cap. The cap C is yieldingly held in projected position by springs 50, 51, and 52, corresponding to the springs 17, 18, and 19 hereinbefore described. The manner of applying and removing the cap C and the ring D is the same as that described in connection with the construction illustrated in Figures 1 to 5 inclusive.

I claim:

1. In a shock absorbing mechanism, the combination with a casing having an open end; of interior, lengthwise extending guide channels at said open end; a spring cap having guide arms extending into and guided in said guide channels for lengthwise movement; retaining flanges at said open end of the casing circumferentially alternated with said guide channels; interior shoulders on said casing spaced inwardly from said flanges; a retaining ring surrounding said cap and having arms engaged between said flanges and shoulders to lock said ring against movement inwardly and outwardly of the casing, said spring cap having shouldered engagement with the ring to limit outward movement of the cap; interengaging means on said cap and ring of rib and groove formation for locking said ring against rotation with respect to the cap and casing; and spring means within the casing yieldingly holding said cap projected with said ribs and grooves interlocked.

2. In a shock absorbing mechanism, the combination with a casing having an open end, said casing having circumferentially spaced, inturned stop flanges at its rear end and lengthwise extending, interior guideways alternated with said flanges; transverse retaining shoulders interiorly of said casing spaced inwardly from the flanges; of a spring cap of cup-shaped form having circumferentially spaced, laterally outwardly projecting arms extending into the guideways and guided for movement lengthwise of the mechanism therein; a locking ring having circumferentially spaced, laterally outwardly projecting retaining flanges engaged between said stop flanges and transverse retaining shoulders to hold said ring against movement lengthwise of the casing; interengaging means of rib and groove formation on said cap and ring for locking the ring against rotation with respect to the cap and casing; means on said cap having shouldered engagement with the ring for limiting outward movement of the cap; and a spring within the casing yieldingly opposing inward movement of the cap and holding the same projected with the rib and groove formation of the ring and cap interlocked.

3. In a shock absorbing mechanism, the combination with a casing having a cylindrical rear end portion, said rear end portion being open; of three circumferentially spaced, inturned retaining flanges at said open rear end of the casing; three longitudinally extending, circumferentially spaced, internal guideways in said casing, said guideways being alternated with said flanges; a spring cap having a cup-shaped portion and three radially projecting arms at the inner end of said cup-shaped portion engaged in said guideways respectively, said arms being guided in said guideways for movement lengthwise of the mechanism; a locking ring against which said cap is shouldered to limit outward movement of the cap, said ring having three circumferentially spaced, laterally projecting retaining flanges engaged respectively in back of the flanges of the casing to hold said ring against outward movement; interior shoulders on said casing inwardly of said flanges of the casing with which said retaining flanges of the ring have engagement for holding said ring against movement inwardly of the casing, said ring surrounding the cup-shaped portion of the cap; interengaging locking means on said cap and ring for locking said ring against rotation with respect to the cap and holding said ring against rotation with respect to the casing, said interengaging locking means comprising cooperating ribs and grooves; and spring means within the casing yieldingly opposing inward movement of the cap and holding said cap projected with the ribs and grooves of said cap and ring interlocked.

4. In a casing open at its rear end and having top and bottom, interior, lengthwise extending guide channels at said rear end; of inturned, diametrically opposite retaining flanges at opposite sides of the rear end of said casing; transverse stop shoulders interiorly of said casing spaced inwardly from said flanges; a cup-shaped spring cap slidingly telescoped within the rear end of the casing, said cap having top and bottom, laterally projecting guide wings at its inner end engaged in said channels and guided for movement therein lengthwise of the casing; a retaining ring surrounding said cup-shaped cap, said guide wings having shouldered engagement with the inner end of said ring to limit outward movement of the cap with respect to the ring; diametrically opposite, laterally projecting retaining flanges on said ring engaged between the retaining flanges and the stop shoulders of the casing for locking the ring against movement inwardly and outwardly of the casing; interengaging locking means on said cap and ring for holding the ring against rotation with respect to the cap and casing, said interengaging locking means comprising interengaging ribs and grooves; and spring means within the casing yieldingly opposing inward movement of the cap and holding said cap projected with the ribs and grooves of said interengaging locking means interlocked.

STACY B. HASELTINE.

REFERENCES CITED

The following references are of record in the file of this patent:

UNITED STATES PATENTS

| Number | Name | Date |
|---|---|---|
| 1,852,567 | Haseltine | Apr. 5, 1932 |
| 2,050,541 | Olander | Aug. 11, 1936 |
| 2,393,297 | Dath | Jan. 26, 1946 |
| 2,426,262 | Dath | Aug. 26, 1947 |